United States Patent

[11] 3,581,293

[72] Inventors George A. Fedde
Norristown;
John Presper Eckert, Jr., Gladwyne, both of, Pa.
[21] Appl. No. 681,598
[22] Filed Nov. 8, 1967
[45] Patented May 25, 1971
[73] Assignee Sperry Rand Corporation
New York, N.Y.
Continuation of application Ser. No. 241,368, Nov. 30, 1962, now abandoned.

[54] FORM OF PLATED WIRE MEMORY DEVICE
9 Claims, 4 Drawing Figs.

[52] U.S. Cl. 340/174
[51] Int. Cl. G11c 11/14
[50] Field of Search 340/174 (TF)

[56] References Cited
UNITED STATES PATENTS

| | | | |
|---|---|---|---|
| 3,160,864 | 12/1964 | Snyder | 340/174 |
| 3,209,333 | 9/1965 | Russell | 340/174 |
| 3,223,986 | 12/1965 | Clark | 340/174 |
| 3,240,686 | 3/1966 | Towner | 340/174TF |

*Primary Examiner*—James W. Moffitt
*Attorneys*—Charles C. English, Rene A. Kuypers and Louis Etbinger

ABSTRACT: This invention relates to a configuration of a plated wire memory device which permits closer packing of the bits. This is accomplished by using a memory element which has a cross section having a major and minor axis. The forward and return portions of the memory drive which are arranged orthogonally to the plated wire are thereby positioned closer to one another. By reducing the distance (*d*) between the drive portions, the width (*w*) thereof can correspondingly be reduced. Reducing (*d*) and (*w*) reduces the drive current for a given field strength and for a given amount of interaction between two adjacent drive lines, the distance *p* can be made smaller.

INVENTORS
GEORGE A. FEDDE
JOHN PRESPER ECKERT, JR.

BY Rene A. Kuypers
ATTORNEY

FORM OF PLATED WIRE MEMORY DEVICE

This application is a continuation of application 241,368 which was filed on Nov. 30, 1962 and is now abandoned.

This invention relates to magnetic memory construction and in particular to the art of thin film memory devices of the destructive or nondestructive type.

Thin film memory devices of the prior art have heretofore comprised magnetizable material which is deposited on round wire or tube substrates. The "read" drive winding, associated with a memory element having a circular cross section, is usually a single-turn wide band solenoid. The "read" solenoids as presently constituted require a large amount of driving power with which to perform the "read" operation and hence, do not permit an efficient mode of operation. Furthermore, since such prior art memories require wide band solenoids as will become apparent hereinafter, high density packing of the elements has not been feasible. Therefore, in a computer of the prior art having a large word capacity memory, the abovementioned deficiencies result in a magnetic memory which is physically large and which requires heavy power consumption.

Further, high density packing of prior art thin film memory systems (plated wires) has been hindered because of mutual inductance coupling between adjacent word drive lines. It has been found that the mutual inductive field between adjacent word drive lines causes a partial rotation of the adjacent thin films, which adversely affects a computer memory readout operation. Mutual inductance between the drive lines can also cause a voltage to be induced in an adjoining sense line when there is a change of current in an adjacent line. This induced voltage may similarly result in a possible attenuation of the readout signal in the memory and therefore, may produce an improper output signal in the sense amplifier.

It is therefore an object of this invention to provide an improved plated wire, thin film memory device.

It is a further object of this invention to provide a more efficient word drive circuit.

It is a further object of this invention to provide a plated wire, thin film memory system which provides high density packing of the memory elements.

It is a further object of this invention to reduce the mutual inductance between adjacent word drive lines.

In accordance with a feature of this invention, data storage bars or wires, which have plated thin magnetizable films thereon, are placed transversely and between the front and rear legs of a U-shaped conductor. The conductor is of narrow width and forms a solenoid around the data storage wire. The data storage bars which are contiguous to the front and rear legs of the single-turn solenoid, have rectangular, elliptical, or other cross sections, wherein one of the two principal axes is smaller than the other.

In accordance with another feature, the required readout drive field ($H_T$), which is developed between the two legs of the solenoid or flux generator, is generated with reduced current and power. As will be explained hereinafter, the current and power which is necessary to generate the readout drive is related to the distance between the legs of the solenoid. It follows that the above feature results from the fact that the legs of the U-shaped solenoid can be brought closer together because the data storage element between the legs has a rectangular, elliptical, or other cross section wherein one of its two principal axes is smaller than the other. Therefore, as the distance between the two legs of the solenoid is shortened, the width of the "read" drive solenoid can similarly be shortened, thus reducing the drive current for a given field strength. By reducing the driving current and by bucking out the overlapping flux as the solenoid legs are placed closer together, there is a corresponding reduction in the distance to which the "read" field extends beyond the drive line. This latter factor enables high density packing of the memory elements to become feasible.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawing wherein:

Figure 1:
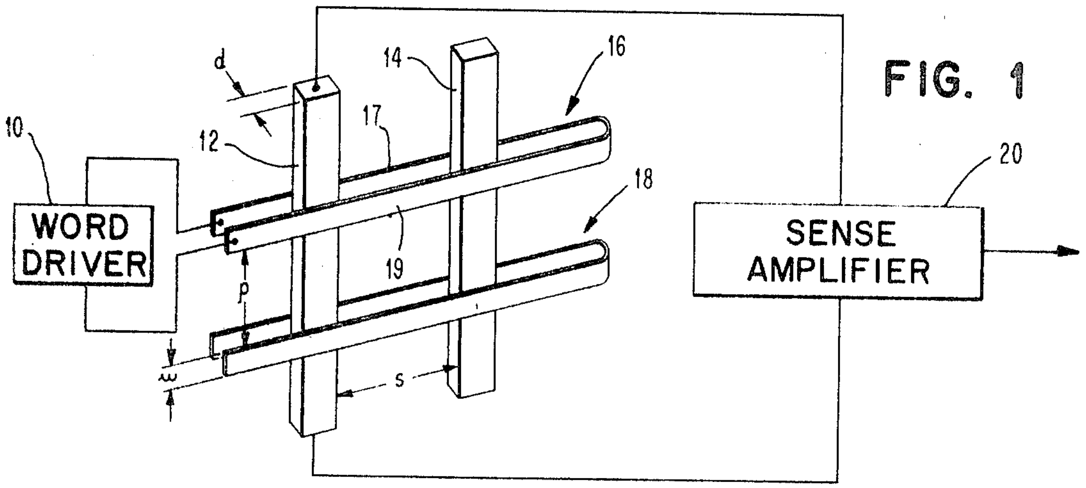
FIG. 1 is an exaggerated view of a portion of a pair of plated wire, thin film memory system elements with the associated circuitry shown in block form.

In operation, there are deposited along the surfaces of the storage bars, whose cross section consists of two mutually perpendicular principal axes wherein one is smaller than the other, magnetizable thin film material. The thin film is magnetizable along the storage bars at any position. Each magnetized spot or portion of the thin film defined by the intersection of the word lines and plated storage bars represents a bit of binary information (i.e., a "0" or a "1") depending upon whether its magnetizing vector ($H_L$) is oriented along the "easy" axis in one direction or 180° reversed therefrom.

Arranged transversely to the storage bars are U-shaped, narrow band solenoids having front and rear legs. The front legs of the solenoids are in juxtaposition to one of the larger surfaces of the storage bars, whereas the rear legs are contiguous to the other larger surface of the storage bars.

The U-shaped, narrow band solenoids, when energized by the word driver and when used in combination with the rectangular or elliptical cross-sectioned storage bars, produce a readout drive field ($H_T$) along the "hard" axis of the films at reduced power and current.

The readout drive field ($H_T$) is large enough so that the magnetization (magnetic moment ) of the film can be rotated from the "easy" axis toward the "hard" axis. The rotation of the magnetic moment of the film produces a certain polarity pulse (i.e., a positive or negative voltage) which is detected by a sense amplifier and determines whether a "0" or "1" has been stored in the memory.

In accordance with this invention, the distance ($d$) between the front and rear legs of the solenoid is reduced by using a storage element that has a rectangular or elliptical cross section, and therefore, the width ($w$) of the solenoid may be correspondingly reduced. As a result of this configuration, for a given field strength the drive current and therefore the power supplied by the word driver is materially reduced.

By being able to reduce ($d$) and ($w$) of the drive solenoid as well as the power required thereby, it has been possible to place more bits of binary information along the length of the storage bar. As a consequence, high density packing of a large address memory has become feasible.

Furthermore, from the fact that the distance ($d$) between the solenoid legs and the driving current can be reduced without loss of field intensity between the solenoid legs, the mutual inductance between adjacent word drive lines is also reduced. This results since the "read" fields which are produced by the "read" currents do not spread as far beyond the word lines. In other words, the mutual inductance is reduced because the flux that extends beyond the area between the two parallel faces of the solenoids is "bucked-out" and hence is substantially cancelled. Hence, induced voltages between contiguous word drive lines are reduced when there is a change of current in an adjacent line. This factor prevents extraneous voltages from being induced in an adjacent word line thereby "reading-out" unwanted binary information from adjacent bit locations in the storage bars, which would result in producing an erroneous signal in the sense amplifier. The extraneous voltage would not normally affect an adjacent word line since such a word line is normally open circuited. However, because of the presence of distributed capacity between word lines, it is possible that leakage currents are set up in adjacent lines which produce a magnetic field capable of partially rotating the magnetic films associated therewith.

In view of the fact that inductive coupling is reduced between adjacent lines, there also is less possibility that the field from an energized word line will cause a partial rotation of the magnetized thin film at an adjacent bit position which factor would similarly produce a possible erroneous signal in the sense amplifier.

Referring now to the accompanying drawings and in particular to FIG. 1, there is provided a plated wire memory device consisting of storage bars 12 and 14 which are separated by a distance S. Arranged transversely and separated by the pitch P are the single-turn, narrow band, driving or "read" solenoids 16 and 18 whose width is designated by ($w$). It is understood, of course, that the number of storage bars and drive lines comprising the memory is determined by the number of words desired as well as the number of bits per word.

The storage bar 12 and "read" solenoid 16 are shown connected by conventional means to appropriate circuitry, namely sense amplifier 20 and word driver 10, respectively. It is understood, of course, that storage bar 14 and "read" solenoid 18 are connected to appropriate circuitry, but for the sake of simplicity, the subject invention will be explained in terms of only a single storage bar and its associated driver solenoid.

Figure 2:
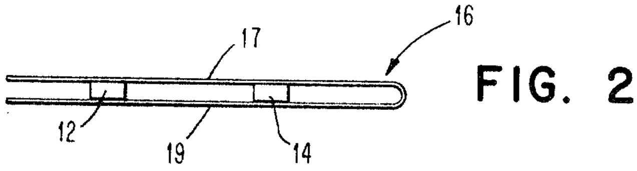
FIG. 2 is a plan view of the memory device shown in FIG. 1.

The magnetic film-plated wires or storage bars 12 and 14 of the instant invention employ a substrate having a cross section wherein one of its two principal axes, which are mutually perpendicular, is smaller than the other. FIG. 2 depicts storage bars whose cross sections are rectangular. The reason for this construction will be fully explained in a later paragraph.

Plated on the surfaces and along the length of the storage bar 12 is a magnetic film of several hundred angstroms thickness. The film can be for example, certain percentages of nickel-iron (e.g. 98 percent Fe and 2 percent Ni or 81 percent Ni and 19 percent Fe). Compositions for films have also been made of different percentages of nickel, iron and cobalt, as well as, various percentages of iron, nickel, phosphorus and arsenic.

During the deposition of the magnetic film on the substrate, a current is caused to flow in the substrate generating an orienting magnetic field. This orienting field sets the uniaxial magnetic anisotropy direction. Depending upon whether the magnetization vectors "written into" the film along the storage bars are in one direction or 180° reversed therefrom, binary numerics, namely "0's" or "1's", may be stored in the memory. These positions of the magnetic vectors are the stable equilibrium positions.

The "read" windings 16 and 18 are in the form of a flat ribbon or single-turn solenoid or narrow width ($w$) and are arranged in such a manner as to lie in juxtaposition with the front surfaces of the rectangular storage bars and then are bent into a closed loop so as to be contiguous to the rear surfaces, that is, the parallel faces of the bars 12 and 14. An insulating coating such as varnish for example, is applied to the data storage bars so that there is electrical insulation between the bars and the front and back legs of the drive solenoids. The "read" driver winding solenoid or word line links as many storage bars as there are bits in a word; for example, in FIG. 1, solenoids 16 and 18 are shown linking two bits of binary information. It should be understood that the number of bits per word may vary according to the design of the computer. There are as many drive winding solenoids as there are words in a memory.

During the read out of a desired word in the memory, which may be selected by means of a diode matrix, an appropriate drive line such as 16, is energized by the word driver 10. A magnetic field intensity ($H_T$), generated by word driver current in the word line rotates the magnetic vector of each magnetized film position of the stored word into partial alignment with the internal field of the solenoid (i.e., the field between the front and rear legs). This results in a change of magnetic flux linking the bar, thereby inducing voltages having one of two polarities on the sense line or bar substrate, depending upon in which of the two stable positions the magnetization vector was oriented (i.e., whether a "0" or "1" was stored in the memory). The voltages are detected and amplified in the sense amplifier 20 which may be gated and sent outside the memory via, for example, an output register.

The mathematical basis for the use of the rectangular or elliptical cross-sectional storage bars in combination with a narrow-width, single-turn solenoid can be explained by a consideration of the following mathematical relationships. The field strength in oersteds per ampere in a circular path around a filamentary length of wire is known to be as follows:

$$(1)\quad \frac{H\text{ (oersteds)}}{I\text{ (ampere)}}=\frac{.4\pi N\text{ (turns)}}{L\text{ (centimeters of path length)}}$$

For a single-turn, this can be reduced to:

$$(2)\quad \frac{H}{I}=\frac{1.26}{L}$$

From this basic relationship it can be shown that the magnetic field intensity in the enclosed volume of a single loop of flat ribbon conductor similar to 16 and 18 in FIG. 1, where the ratio $d/w$ is less than 1/10, is:

$$(3)\quad \frac{H}{I}\propto\frac{k}{w}$$

This latter expression indicates that for a given field strength ($H$), less current ($I$) is needed when the width ($W$) is decreased.

An approximation of equation (1) for a single-loop, flat sheet winding may be expressed in terms of ($d$) and ($w$), where $d/w$ is less than 1/10, as follows:

$$(4)\quad \frac{H}{I}=\frac{.157}{w}\left(\pi\tan^{-1}\frac{2d}{w}\right)$$

Equation (4), which is similar to equation (3), indicates that if the distance ($d$) is made smaller, the width ($w$) of the drive solenoid as well as the driving current ($I$) can also be reduced without any loss of field intensity ($H$). Therefore, the current and power required to generate the transverse magnetizing force ($H_T$) with which to rotate the magnetic vectors of magnetizing force ($H_L$) from the circumferential (easy axis) to the transverse (hard axis) has been greatly reduced without any diminution of field intensity. In a large address memory, the power saving is substantial.

Several benefits, in addition to the aforementioned current and power reduction in the "read" solenoids, are derived from the fact that the rear leg 17 and front leg 19 of solenoid 16, for example, are brought closer together.

One such benefit is that as current travels down the front leg 19 and returns up the rear leg 17 of solenoid 16, for example, the flux that extends beyond the parallel faces of the solenoid, (i.e., outside the space between the faces 17, 19) is materially reduced because there is less flux generated. Furthermore, the flux generated by the solenoid winding that does extend beyond the parallel faces is substantially cancelled.

The flux generated outside of the parallel faces is substantially cancelled since the flux produced from the front leg 19 that extends beyond the rear leg 17 (i.e. outside of the area between the parallel faces) is in the subtractive phase with the flux produced by the current in leg 17; similarly the flux produced by the rear leg 17 that extends beyond the front leg 19 is likewise substantially cancelled, since the flux from 17 is in a subtractive phase with that produced by leg 19. On the other hand, the flux generated by the current traveling down the front and rear legs of the solenoid is in additive phase between the parallel faces. This additive flux produces the required readout field ($H_T$), which is capable of rotating the magnetic vectors of the films from the "easy" toward the "-hard" axis. The various phases of the flux around the drive solenoid can be demonstrated by means of the well known Ampere's Right-Hand Rule.

From the fact that the flux distribution external the drive lines is limited in space, as well as being substantially cancelled, it follows that the pitch P between adjacent word lines 16 and 18 can be reduced and a compact memory provided. Therefore, for a given amount of magnetic coupling between adjacent words in a memory, the pitch (P) can be made smaller in proportion to the reduction of the width ($w$) of the drive solenoids.

By way of further explanation, it can be shown that if the "read" field is reduced, there is a reduction in the mutual inductive coupling ($L$) between adjacent word lines 16 and 18 whenever there is a change of current ($di/dt$) in one of these drive lines during the readout operation. The reduction in mutual inductive coupling results since the flux is more confined around an energized word line 16, for example, and therefore, it does not as readily intercept an unenergized adjacent line 18. Since the inductive coupling is reduced, there is less possibility that the field from an energized word line will cause a partial rotation of the stored information along an adjacent unenergized line. Therefore, the possibility of the desired word signal being attenuated by an adjacent word readout, and hence, producing an erroneous input signal to the sense amplifier is reduced.

The fact that the mutual inductance is reduced between drive lines also results in a reduction of induced voltage in an unenergized line whenever there is a change of current in an adjacent energized line, in accordance with the mathematical equation $$e=L\frac{di}{dt} \quad (5)$$

Such induced voltages do not normally affect the circuit operation since an adjacent line is normally open-circuited. However, due to the possible presence of distributed capacitance between adjacent word lines, it is possible that leakage currents may be carried between unenergized and energized adjacent word drive lines. These currents are capable of generating a magnetic field around the conductors which are able to partially rotate the films associated with the unenergized line, thus possibly producing an erroneous output signal in a sense amplifier.

Figure 3:
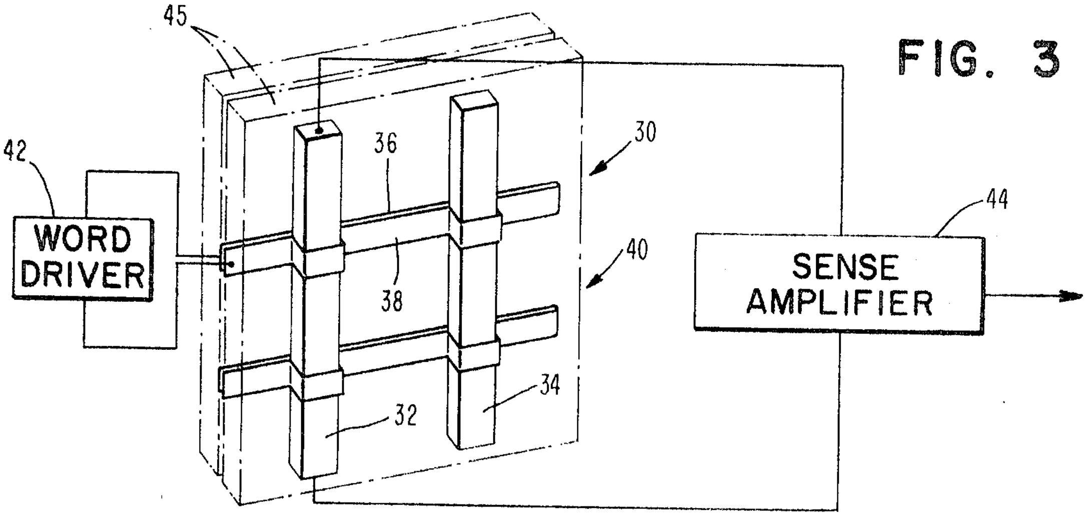
FIG. 3 is a schematic pictorial of another embodiment of the subject invention.
Figure 4:
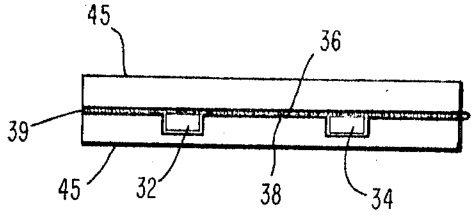
FIG. 4 is a plan view of the embodiment shown in FIG. 3.

FIG. 3, and FIG. 4 which is a plan view of the embodiment in FIG. 3, shows in detail the embossed rectangular grooves in the circuit board substrate 45. It is understood, of course, that the grooves may have an elliptical configuration. Accordingly, it can be seen that the mutual inductance is greatly reduced by arranging the drive lines 36 and 38, so that they are separated only by an insulating material, such as varnish or Mylar.

As hereinbefore mentioned, by reducing the mutual inductance, there is a reduced possibility that the field from an energized word drive line will cause a partial rotation of the magnetized thin film along an adjacent unenergized line. Similarly, from the fact that the close spacing of the drive lines by the etched method is practicable, and further since the portions of the lines between the channels lie in virtually the same location it can be seen that the induced voltage in an unenergized line is reduced even more substantially than the embodiment of FIGS. 1 and 2 in accordance with mathematical equation (5). This factor is important in eliminating leakage currents between an energized and an adjacent unenergized drive line.

In summary, this invention provides a plated wire, thin film memory device, in which the drive lines of the word solenoids can be brought closer to each other by utilizing storage bars having an elliptical or rectangular cross section. This invention further provides that the drive lines can be placed in virtually the same physical location between adjacent storage bars. The foregoing features permit employing a "read" winding having a narrow width, which generates a readout field ($H_T$) at reduced power and current. Therefore, by reducing the power requirements of the drive solenoids, the width ($w$) of the drive solenoids can correspondingly be reduced. Consequently, it has been possible to place more bits of binary information along the length of the storage bars and therefore increase the packing density.

The embodiments of the invention in which an exclusive property or privilege we claim are defined as follows:

1. The nondestructive memory bit arrangement having
  a. a substrate with a major and a minor axis, the two exterior surfaces opposite said major axis having a larger respective area than the respective area of the two exterior surfaces opposite said minor axis;
  b. a magnetic coating surrounding said substrate for storing information, said coating having an easy axis which is circumferential and a hard axis which is longitudinal wherein the quiescent condition, the magnetization of said film is oriented along said easy axis;
  c. an information readout means having a forward means and a return means positioned contiguously and orthogonally to said substrate, said forward means being positioned directly opposite only to one of said larger surfaces and said return means being positioned directly opposite and contiguous only to the remaining larger surface;
  d. means connected to said readout means to rotate the magnetization from said easy to an angle slightly less than said hard axis, a nondestructive read voltage being induced in said substrate by said rotation which is detected across the ends of said substrate when said magnetization rotates back to said hard axis.

2. The combination in accordance with claim 1 wherein said forward means of said readout means is positioned directly opposite to one of said larger surfaces, and said two smaller surfaces, whereas said return means of said readout means is positioned directly opposite only to said remaining larger surface.

3. The combination in accordance with claim 1 wherein said coating comprises a ferromagnetic material which is approximately 80 percent nickel and 20 percent iron.

4. The combination in accordance with claim 1 wherein a sense amplifier is connected across the ends of said substrate.

5. The combination in accordance with claim 1 wherein said readout means is energized by a driver circuit.

6. The combination in accordance with claim 1 wherein said readout means comprises a single-turn solenoid.

7. The combination in accordance with claim 1 wherein a matrix is formed with a plurality of substrates and a plurality of orthogonally positioned readout means.

8. The combination in accordance with claim 7 wherein the separation $p$ of said readout means is related to the ratio of the thickness $d$ and the width $w$ of said readout means.

9. The combination in accordance with claim 2 wherein said forward and return means are respectively etched on a nonconducting substrate.